(12) United States Patent
Livaditis et al.

(10) Patent No.: US 7,062,048 B2
(45) Date of Patent: Jun. 13, 2006

(54) APPARATUS AND METHOD FOR SINGLE ENCRYPTION WITH MULTIPLE AUTHORIZATION OF DISTRIBUTED CONTENT DATA

(75) Inventors: Elias J. Livaditis, Dawsonville, GA (US); Kevin Kennedy, Suwanee, GA (US)

(73) Assignee: Wegener Communications, Inc., Duluth, GA (US)

( * ) Notice: Subject to any disclaimer, the term of this patent is extended or adjusted under 35 U.S.C. 154(b) by 48 days.

(21) Appl. No.: 10/368,546

(22) Filed: Feb. 18, 2003

(65) Prior Publication Data

US 2004/0148501 A1 Jul. 29, 2004

Related U.S. Application Data

(60) Provisional application No. 60/442,832, filed on Jan. 27, 2003.

(51) Int. Cl.
*H04N 7/167* (2006.01)

(52) U.S. Cl. ............... 380/241; 380/240; 380/242; 380/212

(58) Field of Classification Search ........ 380/240–242, 380/212
See application file for complete search history.

(56) References Cited

U.S. PATENT DOCUMENTS

| | | | |
|---|---|---|---|
| 4,578,531 A | 3/1986 | Everhart et al. | 178/22.08 |
| 4,723,283 A | 2/1988 | Nagasawa et al. | 380/20 |
| 4,864,615 A | 9/1989 | Bennett et al. | 380/21 |
| 4,887,296 A | 12/1989 | Horne | 380/21 |
| 5,046,092 A | 9/1991 | Walker et al. | 380/20 |
| 5,054,064 A | 10/1991 | Walker et al. | 380/5 |
| 5,381,481 A | 1/1995 | Gammie et al. | 380/49 |
| 5,485,577 A | 1/1996 | Eyer et al. | 395/188.01 |
| 5,644,354 A | 7/1997 | Thompson et al. | 348/13 |
| 5,799,083 A | 8/1998 | Brothers et al. | 380/20 |
| 5,828,402 A * | 10/1998 | Collings | 725/28 |
| 5,864,621 A * | 1/1999 | Katznelson | 380/219 |
| 5,872,846 A * | 2/1999 | Ichikawa | 380/282 |
| 5,898,695 A * | 4/1999 | Fujii et al. | 370/464 |
| 5,920,626 A | 7/1999 | Durden et al. | 380/10 |
| 6,025,869 A | 2/2000 | Stas et al. | 348/5.5 |
| 6,157,722 A | 12/2000 | Lerner et al. | 380/260 |
| 6,219,422 B1 | 4/2001 | Sato | 380/240 |
| 6,222,923 B1 | 4/2001 | Schwenk | 380/44 |
| 6,240,188 B1 | 5/2001 | Dondeti et al. | 380/284 |
| 6,253,027 B1 | 6/2001 | Weber et al. | 386/287 |

(Continued)

*Primary Examiner*—Gilberto Barron, Jr.
*Assistant Examiner*—Jung Kim
(74) *Attorney, Agent, or Firm*—Husch & Eppenberger LLC (57) ABSTRACT

A content data distribution system uses a single key and multiple program authorization to transmit a plurality of programs in multiplexed data packets such as those used in Digital Video Broadcasting. A receiver has a memory, a descrambler and a processor. Authorization indicators are transmitted among said data packets and stored in the memory. The authorization indicators identify a plurality of authorized data packets corresponding to at least one authorized program and further identifies a plurality of unauthorized data packets corresponding to at least one unauthorized program. Only authorized data packets are output from a receiver in decrypted form. Null sets are substituted for unauthorized data packets. Data packet tables may be rebuilt as necessary to replace tables lost in null set substitution. One key is used to encrypt all programs. Alternatively, a number of keys fewer than the number of authorized programs may be used for encryption. The keys may themselves be encrypted for transmission.

15 Claims, 9 Drawing Sheets

U.S. PATENT DOCUMENTS

| | | | |
|---|---|---|---|
| 6,292,568 B1 | 9/2001 | Akins, III et al. ........... | 380/239 |
| 6,373,948 B1 | 4/2002 | Wool .......................... | 380/241 |
| 6,393,585 B1 | 5/2002 | Houha et al. | |
| 6,424,714 B1 | 7/2002 | Wasilewski et al. ........ | 380/200 |
| 6,424,717 B1 | 7/2002 | Pinder et al. ............... | 380/239 |
| 6,463,059 B1 | 10/2002 | Movshovich et al. ....... | 370/389 |
| 6,577,806 B1 * | 6/2003 | Hirota ........................ | 386/46 |
| 2002/0041337 A1 * | 4/2002 | Candelore ................... | 348/591 |
| 2002/0146125 A1 | 10/2002 | Eskicioglu et al. ......... | 380/255 |
| 2002/0161997 A1 | 10/2002 | Yamasaki et al. ........... | 713/150 |

* cited by examiner

| 300 | 302 | 304 | 306 |
|---|---|---|---|
| C PAT | C PAT | NULL | C PAT (INSERT) |
| S PMT1 U | C PMT1 U | NULL | NULL |
| S VID1 U | S VID1 U | NULL | NULL |
| S AUD1 U | S AUD1 U | NULL | NULL |
| S PMT2 A | C PMT2 A | C PMT2 A | C PMT A |
| S VID2 A | C VID2 A | C VID A | C VID A |
| S AUD2 A | C AUD2 A | C AUD A | C AUD A |

Figure 4

| C PAT |
|---|
| S PMT U |
| S VID U |
| S AUD U |
| S PMT A |
| S VID A |
| S AUD A |

200

| NULL |
|---|
| NULL |
| NULL |
| NULL |
| NULL |
| S VID |
| S AUD |

202

| NULL |
|---|
| NULL |
| NULL |
| NULL |
| NULL |
| C VID |
| C AUD |

204

| C PAT (INSERT) |
|---|
|  |
|  |
|  |
| C PMT A |
| C VID A |
| C AUD A |

206

Figure 5 ial application 60/442,832 filed on Jan. 27, 2003
APPARATUS AND METHOD FOR SINGLE ENCRYPTION WITH MULTIPLE AUTHORIZATION OF DISTRIBUTED CONTENT DATA

CROSS-REFERENCE TO RELATED APPLICATIONS

This Application claims priority under 35 USC §119 (e) to provisional application 60/442,832 filed on Jan. 27, 2003 for an Apparatus and Method for Single Encryption with Multiple Authorization of Distributed Content Data".

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of encrypting content data for content data distribution networks, especially broadcast network video data.

2. Related Art

It is common for networks that distribute content such as music, video or data to multiplex data packets in a data stream transmission that comprises multiple programs. It is also common to encrypt or scramble broadcast programming. It is desirable to control access to programs separately because subscribers receiving transmission typically subscribe to some but not all of the transmitted programs, and for other reasons such as local blackouts of athletic events.

In the prior art various encryption systems have been used for security and to control access. These systems generally encrypt transmitted content data with a secret algorithm using a secret key. In prior art data distribution networks, multiple keys were used. Many encryption systems convolve random number sequences with the key algorithm and generate a "seed" that is necessary to decrypt the content. A receiving unit having the key uses it and the received seed to reverse the algorithm and decode the content. Varying levels of complexity for key algorithms are known, and provide varying levels of security. For broadcast or distributed content, encryption keys may be transmitted to receivers. For security enhancement, the keys may be rapidly changed.

In the prior art it has been possible to encrypt all programs according to a single encryption system. However, encrypting all the programs identically does not allow program-by-program access control.

According to the known prior art, the process of encrypting separate programs of content separately, so that subscribers are only allowed to descramble those programs to which they subscribe, involved separately encrypting and separately decrypting each individual program. Multiple keys were required.

Keys are often generated by relatively complex and expensive devices such as pseudo random sequence generators. The sequence generator may be generically understood to be a shift register executing an exclusive OR function according to an encryption algorithm. The receiving device must also have pseudo random sequence generator to execute the converse exclusive OR instruction to decode the content.

Separate encryption for each program according to the known prior art therefore required a separate decoding apparatus for receiving and executing the multiple keys for each of the separate programs. The multiple key mechanisms for separately decoding multiple programs at receiver units involved the cumbersome and expensive necessity of separate decoders separately executing separate keys for each of the programs. Alternatively, large decoders with large look up tables for all data packet identification (PID) headers and multiple state machines could be used. In any case, the receiving device must have more expensive hardware to execute the additional processing required. Finally, greater bandwidth is used at all levels of the system.

There is a need in the industry for an adequately secure encryption system that can decode multiple programs separately using fewer decoders executing fewer keys than the total number of programs encrypted, and that can do so with less expensive processing. One approach to doing so is to control the data comprising the various programs to categorize programs into authorized and unauthorized groups of data.

Most digital data distribution systems commonly work according to common familiar concepts. Multiple content data streams, video, audio or data, are divided into packets, multiplexed, transmitted, demultiplexed and routed for use to various receivers. The MPEG2 protocols are illustrative of the class, and characteristic of the embodiments discussed herein. Other protocols such as MPEG1 or DSS are alike in function although they vary in detail.

The Moving Picture Experts Group (MPEG) is the expert group of the International Organization for Standardization (ISO) that has defined the MPEG-2 standard protocol; a format that can be used to describe a coded video bitstream. It does not specify the encoding method. Instead, it defines only the resulting bit stream.

Video compression is an important part of the MPEG standards. Additionally, MPEG-2 includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the format with which audio or video information is represented. Any authorization control manipulation and any decryption must ultimately output data in this format for MPEG-2 applications At some point, the video, audio, and other digital information must be multiplexed together to provide encoded bitstreams for delivery to the target destination. The Systems portion of the MPEG-2 standard (ISO/IEC 13818-1) defines how these bitstreams are synchronized and multiplexed together. Typically, video and audio data are encoded at respective video and audio encoders, and the resulting encoded video and audio data is input to an MPEG-2 Systems encoder/multiplexer. This Systems multiplexer can also receive other inputs, such as control and management information such as authorization identifiers, private data bitstreams, and time stamp information. The resulting coded, multiplexed signal is referred to as the MPEG-2 transport stream. Generally, a data transport stream is the format in which digital information is delivered via a network to a receiver for display.

The video and audio encoders provide encoded information to the Systems multiplexer in the form of an "elementary stream". These elementary streams are "packetized" into packetized elementary streams which are comprised of many packets. Each packet includes a packet payload corresponding to the content data to be sent within the packet, and a packet header that includes information relating to the type, size, and other characteristics of the packet payload.

Elementary stream packets from the video and audio encoders are mapped into transport stream packets at the Systems encoder/multiplexor. Each transport stream packet includes a payload portion which corresponds to a portion of the elementary packet stream, and further includes a transport stream packet header. The transport stream packet header provides information used to transport and deliver the information stream, as compared to the elementary stream packet headers that provides information directly related to the elementary stream. Each transport packet header includes a packet identifier (PID) to identify the digital program or elementary stream to which it corresponds. Within the transport packet header is a packet identifier (PID), which is a 13-bit field used to identify transport packets which carry elementary stream data from the same elementary stream, and to define the type of payload in the transport packet payload.

Before the transport stream is decoded, the transport packets must undergo analysis, synchronization, demultiplexing, as well as other packet manipulating functions. These functions can be managed by devices such as a MPEG transport demultiplexor, in a known fashion.

Each transport stream may contain different elementary streams, each of which carries different video, audio and possibly data information all corresponding to a common program. Accordingly, after synchronization and demultiplexing, elementary stream packets must be organized from the various streams and transport packets carrying them to output coherent content. Tables are used to do this.

Packet Identification (PID) tables are updated when the system is first powered up and when the viewer changes the channel being viewed. Upon every power up sequence, the PID table is expressly updated by the host. Similarly, the host updates the PID table when a viewer performs a change channel operation.

PID tables are organized into Program Map Tables, which in turn are subsets of Program Association Tables. Packets must be properly organized according to these tables before being output for play as coherent programs. To play upon output, identification headers must be in the tables, although the content data payload associated with them is arbitrary.

While there always remains a need for increased efficiency in the management of data processing and encryption for the individual receivers used by individual satellite TV subscribers, there is a particular need for processing, authorization and encryption management efficiencies in receivers dedicated to serving groups of subscribers. This particular need would be most apparent when the receiver is for an operator of a cable TV or radio service, radio station using the content for rebroadcast, television station using the content for rebroadcast, internet provider cable services, voice over internet services, rebroadcast over LANs, or virtually any service wherein a receiver outputs a data transport stream to be accessed by a plurality of users downstream.

SUMMARY OF THE INVENTION

It is in view of the above problems that the present invention was developed. The invention is a single key/multiple access decoder system capable of separately decoding selected programs from among multiple programs that are transmitted over a data transport stream. Only authorized programs are decoded and played. Authorization is executed according to Authorization Lookup Tables transmitted in a data transport stream and changeable with transmitted Control Instructions. The Authorization Look Up table associates Packet IDs in packet headers with authorization indicators indicating whether a packet is part of an authorized program or an unauthorized program. Data packets comprising unauthorized programs are substituted with a null set. Data packets comprising authorized programs are descrambled. Program Association Tables that are required by a data transport protocol, such as the MPEG protocol, are rebuilt by the system of the present invention to compensate for the null set insertion for Program Association Tables for unauthorized programs.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention.

DETAILED DESCRIPTION OF THE PREFERRED EMBODIMENTS

The present invention is particularly advantageous in digital multimedia communications systems implementing the MPEG (Moving Pictures Experts Group) standards such as the MPEG-1 (ISO/IEC 11172) and MPEG-2 (ISO/IEC 13818) standards, and in data transport stream applications relating to digital video in broadband networks. The present invention may be applicable to many digital communication environments such as MPEG-1, DSS, DVB, DVB/ASA, STCE and the like. However, an appreciation of the invention is best obtained in the context of the following diagrams, in which an MPEG-2 transport stream receiver and decoder system is shown according to the present invention.

Figure 1:
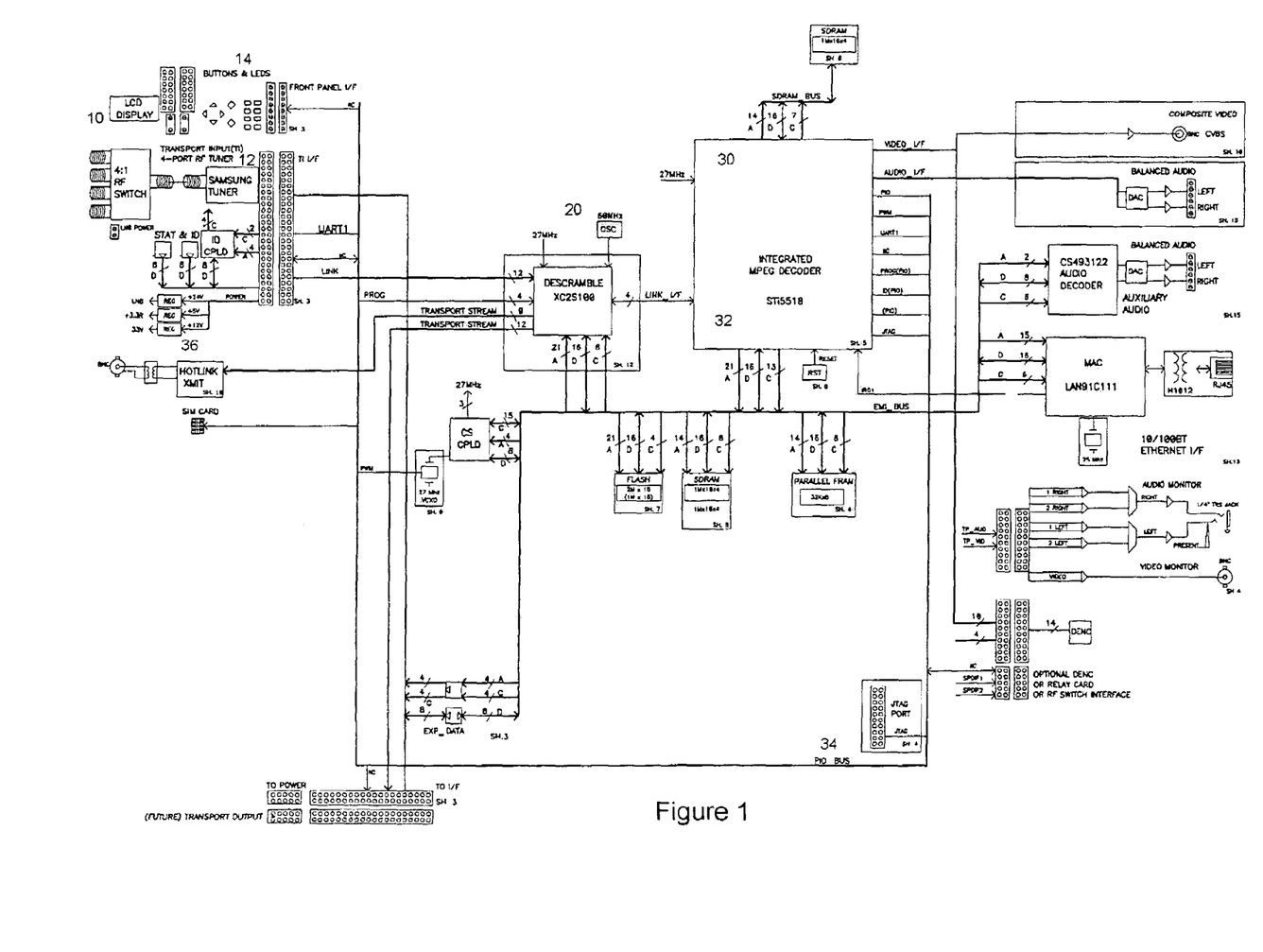
FIG. 1 is a block diagram of a main receiver circuit board.

Referring now to the figures in which like reference numbers correspond to like elements, FIG. 1 is a block diagram of the circuit board of an integrated receiver/decoder for a broadcast video and/or audio data stream. A raw data transport stream is received by antennas into RF switch 10. The data stream proceeds to Tuner 12. An operator interface is provided at 14. The raw data transport stream, containing multiplexed packets each identified by a Packet Identification (PID) in a packet header, are transmitted by a bus to descrambler 20. The descrambler is detailed in FIG. 2. The descrambler is a field programmable gate array, or, alternatively, a ASIC or other integrated chip or a hard drive configured according to the present invention.

The decrypted data transport stream is forwarded by descrambler 20 to the MPEG decoder 30. The decoder includes a "host" microprocessor 32. In the depicted embodiment, MPEG decoder 30 decompresses the transport data stream according to MPEG protocols. Alternatively, other protocols may be executed according to the present invention. Decompressed streams of video and audio data proceed from MPEG decoder 30 across PIO bus 34 to a serializing XMIT circuit 36 for video output. In addition to an data transport stream output, an monitor may be output for analogue conversion or troubleshooting.

A secure processor works in conjunction with microprocessor 32 to receive periodic decryption "seeds" using a received single key, in the manner detailed below. The secure processor may be depicted SIM card 38, a smart card or other secure processor.

Encryption

Various encryption techniques are known to those in the data transmission arts. Some are discussed in U.S. Pat. No. 4,887,296 to Horne, U.S. Pat. No. 5,381,481 to Gammie et al., and U.S. Pat. No. 6,424,714 B1 to Wasilewski et al. It is within the scope of the present invention that various encryption systems may be used to execute the present invention, provided that a fewer keys encrypt content data than there are separate programs to encrypt. In a depicted embodiment, a single key is used. For example, in the depicted embodiment, a pseudo random sequence generator at the transmitter encodes the content data with a "seed" according to a known technique. The pseudo random sequence generator outputs from a shift register, and a seed is simply the value of all bits in the register at a particular time. A seed is a recordation of an encryption algorithm generated when the shift register of the pseudo random sequence generator executes an exclusive OR function according to the algorithm.

Generally, an encryption algorithm encrypts or "scrambles" a packet in a data transport stream. A decryption algorithm decrypts a scrambled received packet using the received seed.

To enhance security, the seed itself is encrypted before transmission. An encrypted seed is called a key. Keys may be different for each integrated receiver/decoder unit. In the prior art, individual programs also have separate keys, causing a great proliferation in the number of keys and the amount of hardware and processing power necessary to decrypt them.

It is considered to be within the scope of the present invention to use any encryption algorithm, including without limitation the "Common Scrambling Algorithm" of the Digital Video Broadcasting Standards promulgated by the European Telecommunications Standards Institute, see, ETR 289, "Digital Video Broadcasting; Support for use of scrambling and Conditional Access within digital broadcasting systems," either in "MultiCrypt" or "SimulCrypt." Proprietary algorithms can also be used, such as that owed by the assignee hereof, Wegener Communications Inc. Moreover, any number of encryption keys less than the number of programs being distributed will conserve bandwidth and required receiver processing power, according to the system of the present invention. Although a single key may be preferred, N–1 keys for distribution of N programs is within the scope of the present invention.

In the depicted embodiment, keys are transmitted as separate data packets transmitted among control instruction data, which is described below. This data stream is on the same channel as the content data packets. Alternatively, seeds, control instructions or even alternate content data may also be transmitted on a second channel. Key packets are processed through the microprocessor 32, decrypted by SIMM 38 or a smart card and then returned as seeds to the decoder 20 for use in decrypting the content data packets.

In the depicted embodiment security is enhanced without losing the advantages of the single key system as follows. The key packet is subjected to its own separate encryption. In the depicted embodiment, this level of encryption is more secure and more complex than the underlying seed encryption. This level of security may be, for example, according to the Data Encryption Standard, as is known in the industry. The encrypted seed will be changed at a rate sufficiently rapid to discourage unauthorized decryption, but nevertheless at a rate slower than the receipt and decryption of the content data. For example, new encryption seeds may be received and executed on the order of once every second, or ten times per second.

Control Instructions

Control instructions are also transmitted with the data transport stream. Control instructions such as those disclosed in the U.S. Pat. No. 4,985,895 to Pelkey, which is incorporated by reference herein, are sent by an uplink transmitter to all receivers, groups of receivers and/or individual receivers. The instructions control parameters such as program scheduling, scheduling of replay of stored advertisements, storing in the receiver's memory content such as commercial advertisements or back up programming to be played in the event that a transport stream signal is lost, and the like. Some of these control instructions may be stored in a flash memory to be recalled on a scheduled basis for execution later. The control instruction data stream is transmitted among the data transport stream, or alternatively over a second channel. The control instructions are also used to execute the receipt and application of key instructions, according to the system of the present invention.

Control instructions are also used in the single key/multiple authorization system to execute authorization of programs. Authorization identifiers defining unauthorized and authorized programs are stored according to control instructions received into the host microprocessor 32. The authorization identifiers are saved into an authorization lookup table associating identifiers with the PIDs that comprise to authorized programs.

Finally, control instructions may guide the alteration of Program Association Tables (PATs) that are disrupted by the insertion of null sets for packets corresponding to unauthorized programs. The PATs must be reconstituted into a standard format such as MPEG-2 to generate executable output.

Tables

Tables are required by most data transport protocols for re-assembly of multiplexed data packets. Table information is transmitted with the content data itself in the raw data transport stream. The tables store header information for each packet, which will include address and packet identification (PID) information for locations of the content data. In the depicted embodiment, which uses the MPEG2 protocol for video transmission, these tables are called Program Map Tables.

Program Map Tables (PMTs) are in turn held in Program Association Tables (PATs). Program Association Tables organize the content programs. For each program, the PAT stores in order the PMTs that comprise that program and that are needed to output the proper video and audio content packets in their proper order to the MPEG decompressor 30 and to the output data transport stream that actually plays the video and audio of the program. A variety of auxiliary services have associated PMTs as well. These may include text PIDS, as for closed captioning, splice indicators for local commercials, or the like. PATs and PMTs are transmitted as their own data packets along with the video and audio content data packets in the transport data stream.

Figure 2A:
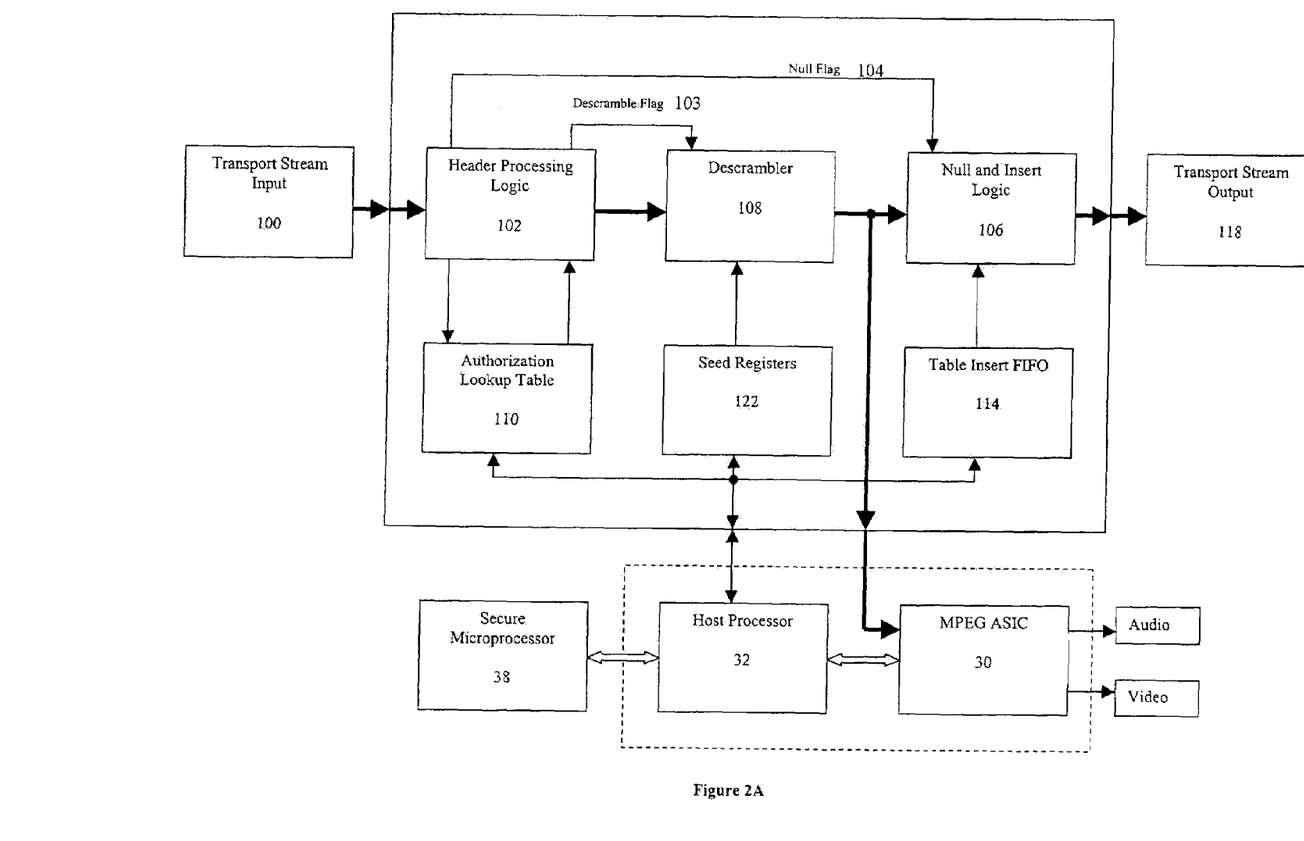
FIG. 2A is a block diagram of a single key decoder/receiver.
Figure 2B:
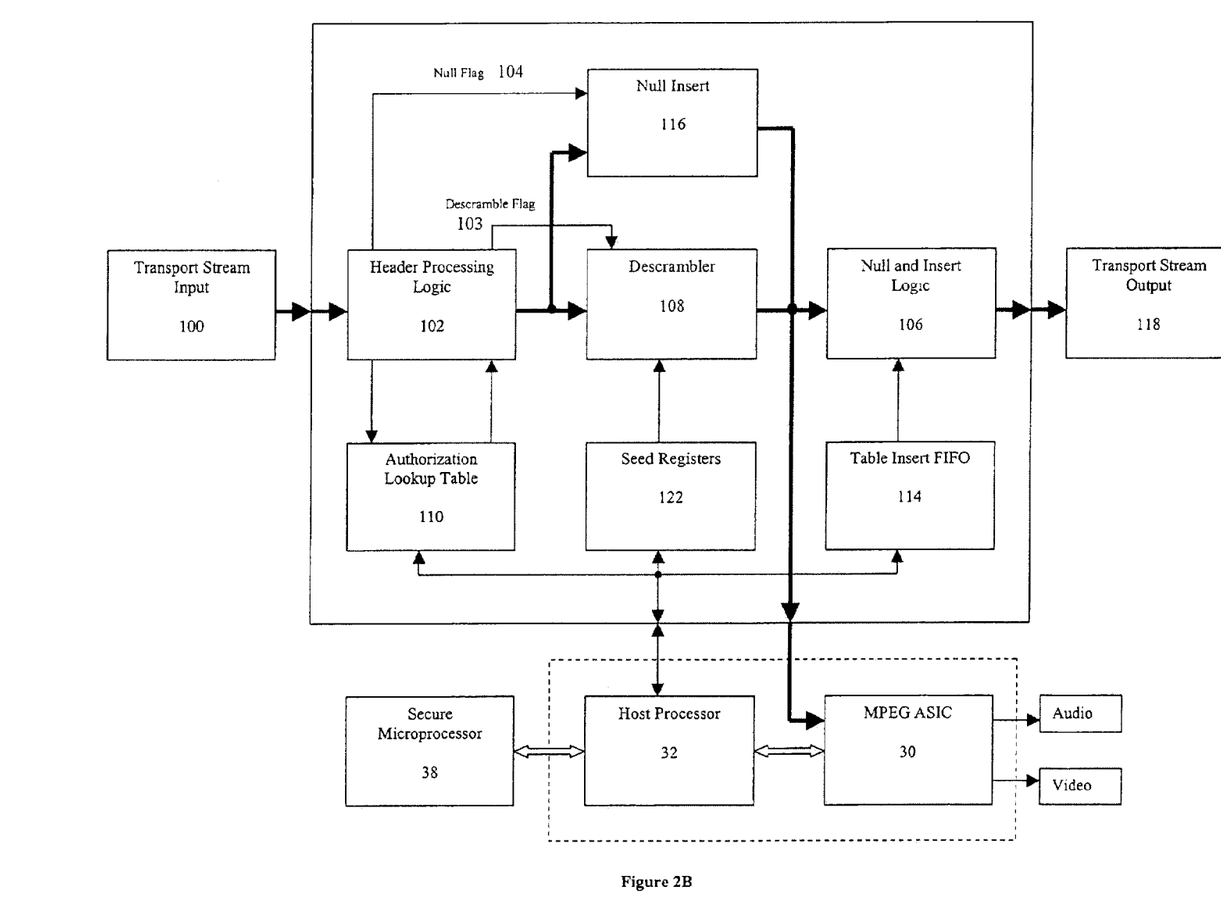
FIG. 2B is a block diagram of an alternative single key decoder/receiver.
Figure 2C:
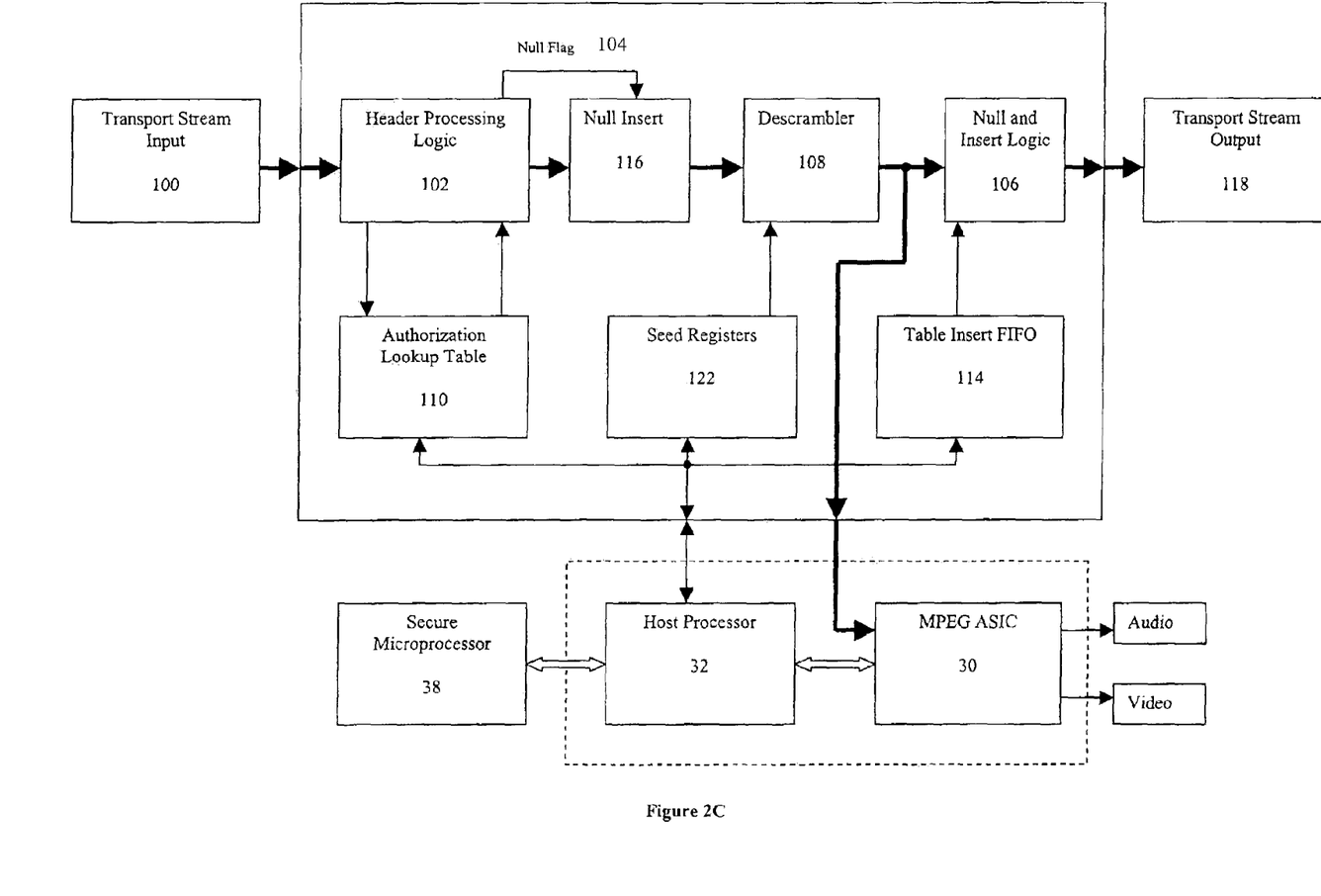
FIG. 2C is a block diagram of another alternative single key decoder/receiver.

The MPEG decompressor 30 is formatted to receive the PATs in the particular MPEG-2 format. So is the external play equipment downstream along the output data transport stream. The external play equipment receives the parallel output 118 in FIG. 2. The formatting protocol has multiple requirements, for example, MPEG-2 requires that PATs be received at a designated rate (about 200 times per second). More to the point, any external play equipment cannot process any video or audio data packets in a data transport stream if the packets are not associated with a PAT and/or a PMT.

The single key encryption system decodes authorized programs. The control instructions indicate which programs are unauthorized. The data packets for the unauthorized programs are replaced with null sets. The output data transport stream never receives the content data packets for unauthorized programs. However, the PAT and PMT packets are identified as belonging to particular programs, and as such are also replaced with null sets. Therefore, in order to properly format the content data stream for receipt by the MPEG decompressor 30 and external play equipment, the PATs must be re-built, as described below. The packets that are flagged for descrambling or null substitution, and the packets that are replaced with null sets, are transport packets, although it is considered to be within the scope of the present invention to flag and/or null substitute elementary stream packets, or any other data packet in another protocol or standard. A content data packet, as used herein, shall mean a packet containing video or audio data, tables, instructions or any other type of data such as files, executable code, or voice data, whether transmitted over the Internet, by cable, satellite or terrestrial broadcast, or otherwise.

Single Key/multiple Authorization

On initialization, all packets from the Transport Stream Input 100 with encryption bits set on are not descrambled 108. Also all packets are null substituted 106 and the Transport Stream Output 118 contains all null packets.

The MPEG ASIC 30 monitors the transport stream for PATs, and control instructions, which are sent without scrambling and for encrypted keys which have unscrambled headers with unscrambled PIDs. Also, some content programming may be transmitted without encryption. The ASIC's transport decoder 30 extracts all these packets and makes them available to the ASIC's Host Processor 32.

Building the Authorized PID Lookup Table

The incoming data transport stream needs to be processed by the host microprocessor 32 in the MPEG decompressor 30 in order to build and maintain the PID authorization lookup table 110. This processing is internal only, and does not decrypt unauthorized content data for the external data transport stream.

The control instructions that are addressed to the individual receiver or group of receivers include authorization identifiers that identify those packets associated with unauthorized programs for null-substitution, and identify the authorized programs for decoding. Those identifiers and their associated PIDs are kept in a Dual Port Memory (DPM) as the PID authorization lookup table 110. As will be recognized by those of skill in the art of transmitting MPEG data, the PID lookup table is a Digital Program Insertion selection table.

After initialization, the Host Processor 32 monitors the incoming data transport stream for PIDs for control instructions and data containing the table of authorized programs. The Host Processor 32 compares the programs in this table to the Program Association Table (PAT) and acquires the PID numbers of the Program Map Tables (PMT) referenced in the authorization table. The Host Processor 32 loads the PIDs from the PMT into the Authorization Lookup Table 110.

Thus loaded, the PID authorization lookup table 110 enables the Header Processing 102 to now flag all following PIDs for descrambling if they are authorized or null substitution if they are unauthorized. If a received packet in the incoming data transport stream is presented to the Header Processor 102 with it's odd or even scrambling bit set, its PID will be looked up in the Authorization Lookup Table 110. If neither odd nor even scrambling bit is set in the packet header, the packet is an unscrambled packet such as a control instruction to be routed to the microprocessor 32 for processing. If either scramble bit is set, the Authorization Lookup Table 110 is used to flag unauthorized packets for the null substitution circuit 106, and flag authorized packets for decoder 108, for the standard decoding outlined above.

Seeds

The Host Processor 32 continually monitors the incoming control instructions packets in the transport stream for the next even or odd ciphered key. When a key is received, the Host Processor 32 forwards the key to the Secure Microprocessor 38 where the key is deciphered and returned to the Host Processor 38 as a deciphered seed. The deciphered seed is loaded into the descrambler Seed Register 122. The seed register holds the current even and odd decryption seeds making them available to the Descrambler 108 for use.

Multiple Authorization

FIGS. 2A, 2B and 2C detail the configuration of the decoder 20 for execution of the single key decryption system of the present invention. An incoming data transport stream, including multiple programs, is received from the tuner across bus 100. All the programs have been encrypted at the transmitter with the same key.

The following features are common in FIGS. 2A, 2B and 2C. The bold arrows indicate the flow of the data transport stream with its transport packets of content data. Other arrows indicate the flow of other data. The embodiments depicted in FIGS. 2A, 2B and 2C processes three transport packets at a time. One transport packet will be within the circuit represented by the header processing logic 102. A packet received immediately before the packet in header processing logic block 102 will be in the scrambler block 108 being processed. The transport packet received immediately before that will be in the null substitution and insert logic block 106. Of course, it is considered to be within the scope of the present invention that greater or lesser volumes of transport packet through put may be executed in other embodiments without departing from the system of the present invention.

The headers and ID information in the transport packets are not changed by the process depicted in FIGS. 2A, 2B and 2C. That is, although they are either descrambled or substituted for null sets, the bits and bytes representing ID and other header information are not otherwise changed. However, it remains within the scope of the present invention that designation of authorized packets for descrambling and unauthorized packets for null set insertion may be executed by other means than the depicted flags, and such means may include alteration of packet header bits.

As indicated previously, encrypted keys are received among the incoming data transport stream, or, alternatively, on a separate channel. These keys are taken from the data transport stream by the MPEG ASIC 30 and presented to host processor 32. Host processor 32 presents the keys to secure microprocessor 38 where the keys are decrypted into seeds. The seeds are returned through host processor 32 and retained in a seed register 122. From the seed register 122, they are available to descrambler 108 for execution of descrambling.

In each of the FIGS. 2A, 2B and 2C, a transport steam output 118 is produced. The data transport stream is also available to the MPEG ASIC for selection of an individual program for output into analog equipment through audio and video digital/analog converters. Other uses may be made of such selected data, such as troubleshooting.

Figure 3A:
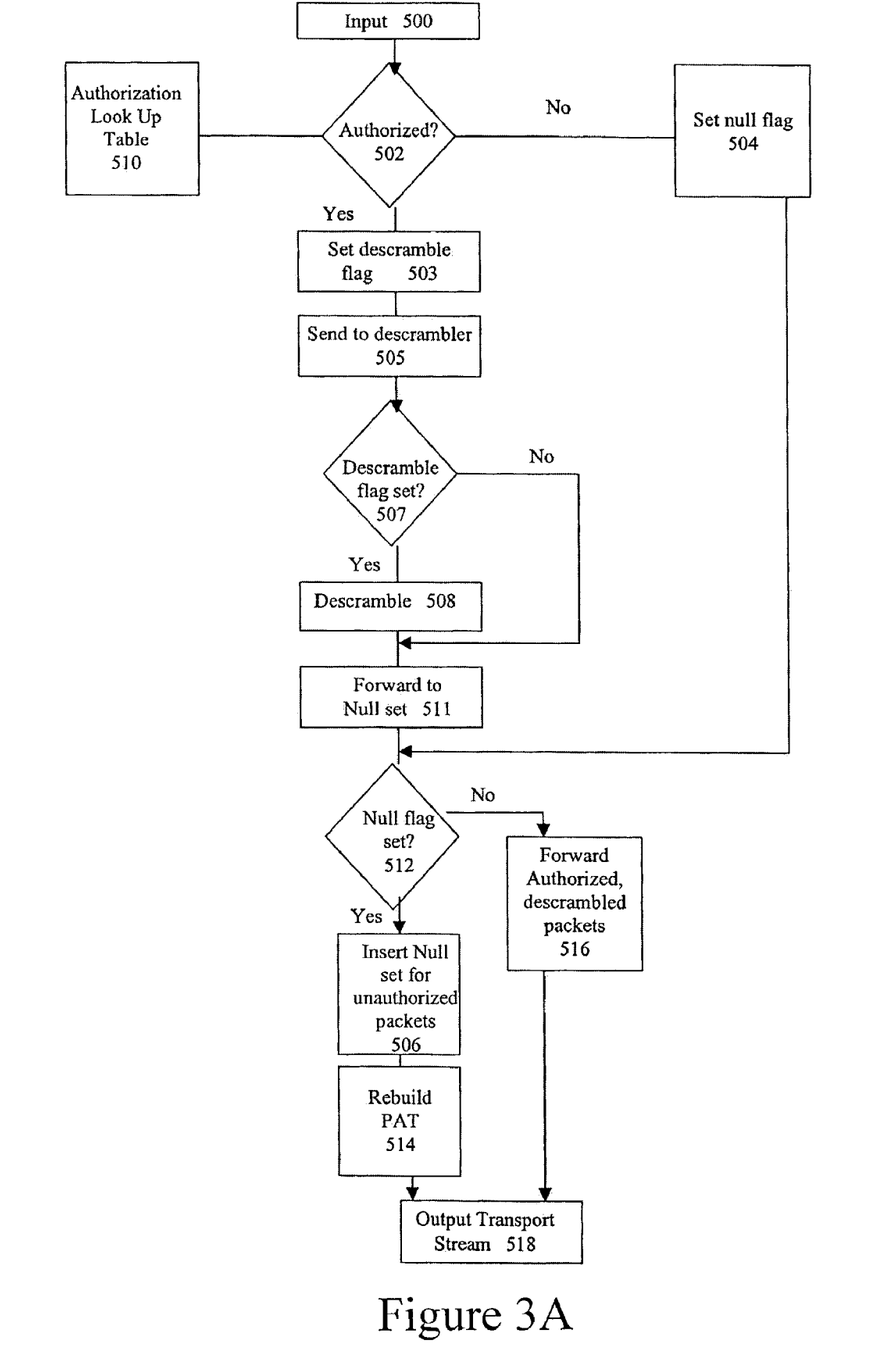
FIG. 3A is a flow chart for a single key/multiple authorization system.

FIGS. 2A and 3A are a block diagram and flowchart, respectively, for a first embodiment of the present invention. In the embodiment depicted in FIGS. 2A and 3A, transport packets proceed serially through descrambler block 108 and null set insertion block 106.

When data packets are first received at the header processing block 102 they are compared to the authorization indicators and their associated packet identifiers stored in authorization look up table 110 in an authorizing step 502. Unencrypted packets are passed through. Unencrypted PATs, control instructions etc. are presented to microprocessor 32 and unencrypted programming content data is passed through for play as part of the output transport stream 118,518. Packet headers include 2 bits for encryption. If both bits are 0, the packet is not scrambled. If either bit is 1, the packet is scrambled. Encryption using an even seed or an odd seed is indicated by the encryption bits being set as 1, 0 or 0,1.

If, according to the authorization look up table 110, the packet corresponds to an authorized program, a descramble flag is set 503 in FIG. 3A, and the flag is indicated at 103 in FIG. 2A for operation by descrambler 108. Flagging procedures are known in the art and use a counter (not shown) to synchronize the execution of a flagged instruction by a data structure with the receipt of the data to be acted upon. In the present embodiment, if the transport data packets are in DVB protocol they will be 188 bytes long. Therefore the number of clock cycles to load a transport packet into the scrambler 108 for execution of descrambling will depend on bus width. If a 16 bit bus is used, 94 clock cycles will be flagged. Using the counter, the flag synchronizes descrambling with loading of the authorized transport packet to be descrambled.

If the received packet is unauthorized according to the authorization look up table, then a null substitution flag 104 is set at step 504. Again, flagging proceeds in a known fashion.

In FIG. 2A, descrambler 108 is configured to pass through all the received packets, whether those packets have been descrambled or not. According to the instruction received as the descramble flag 103, descrambler 108 will descramble authorized packets and pass them forward as "clear" or descrambled and pass on unauthorized packets in their still scrambled format.

After flagging has been executed by block 102, all packets are sent to descrambler 108 at step 505.

If the descramble flag has been set 507, descrambler 108 descrambles the flagged packet 508. The descrambled packet is then forwarded to the null substitution block 106 in step 511. If the descramble flag is not set, the descrambler 108 forwards the still scrambled packet in step 511 to the null substitution block 106.

When the null substitution block 106 receives packets from the descramble block 108, the null substitution flag 104 will already be set or not set. If the null substitution flag is set, 512, null sets will be inserted for unauthorized packets 506. If the null substitution flag is not set, the descrambled packets are forwarded 516 on to the output transport stream 518. The packets that are not substituted with null sets are received from the descrambler 108 already descrambled. Accordingly, the output transport stream receives only authorized packets in their descrambled form.

If the null substitution flag was set 512 and the unauthorized data packets had null sets substituted into them 506, the null substitution and insert logic block 106 will rebuild the Program Association Tables 514 when required, to the extent necessary to present to the transport stream output 118 a transport stream that is in a format which can be executed according to the relevant protocol. In the depicted embodiment, that means that PATs will be reinserted in the data transport stream where null sets had been inserted for them according to step 506, null substitution for unauthorized packets. The payload or content portion of the packet remains the same, that is, null.

Figure 3B:
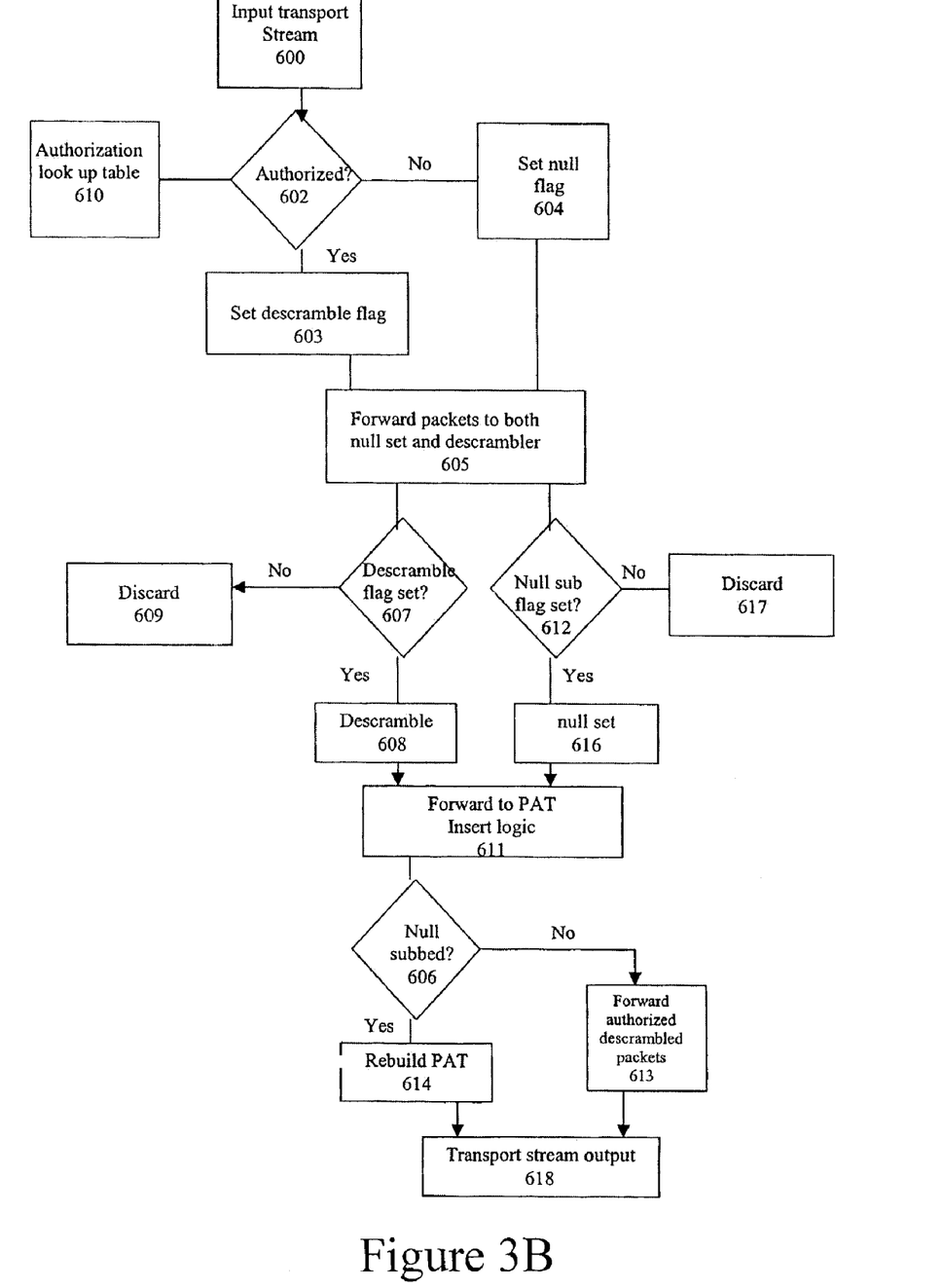
FIG. 3B is a flow chart for an alternative single key multiple authorization system.

FIGS. 2B and 3B are a block diagram and a flow chart of a second embodiment of the present invention. The second embodiment forwards packets to a null set insertion block and a descrambler block in parallel.

Upon receipt of a packet in the data transport stream input packet 100/600, the authorization step is performed 602 by header processing logic block 102 which compares an incoming packet header with headers and authorization indicators stored in authorization look up table 110. If authorized, step 603 sets a descramble flag 103. If not authorized, step 604 sets a null substitution flag 104. The packet is next forwarded in parallel via a split bus to both the null set insertion block 116 and the descramble block 108, at step 605.

If the descramble flag is set, the packet is descrambled 608 by descrambler 108. If it is not set, the packet is discarded 609 and progresses no farther.

The same packet is received at null set insertion block 116 where it is determined if a null substitution flag is set 612. If it is, null sets are inserted for the packets of the unauthorized packet 616. If a null substitution flag is not set, the packet is discarded by the null set insertion block 116 at step 617. As is appreciated by those skilled in the art, the authorization step 602 will flag each packet for either descrambling or null set insertion. The same packet can not be flagged for both null set insertion and descrambling. Likewise, no encrypted packet may proceed without one or the other flags being set. This logic is self executing from the authorization step 602 of comparing incoming PIDs with the authorization look up table 110, which has an authorization indicator associated with that PID or not.

The null substitution and insertion block 106 will receive a next packet from either the descramble block 108 or the null set insertion block 116. At step 606 block 106 will determine if a null set insertion has occurred. If so, the Program Association Table PID will be rebuilt 614 when required to the extent necessary for outputting an executable format into transport stream 118. If step 606 determines that no null set insertion has been performed on the received packet, a descrambled, authorized packet is forwarded 613 into the transport stream output 618.

Figure 3C:
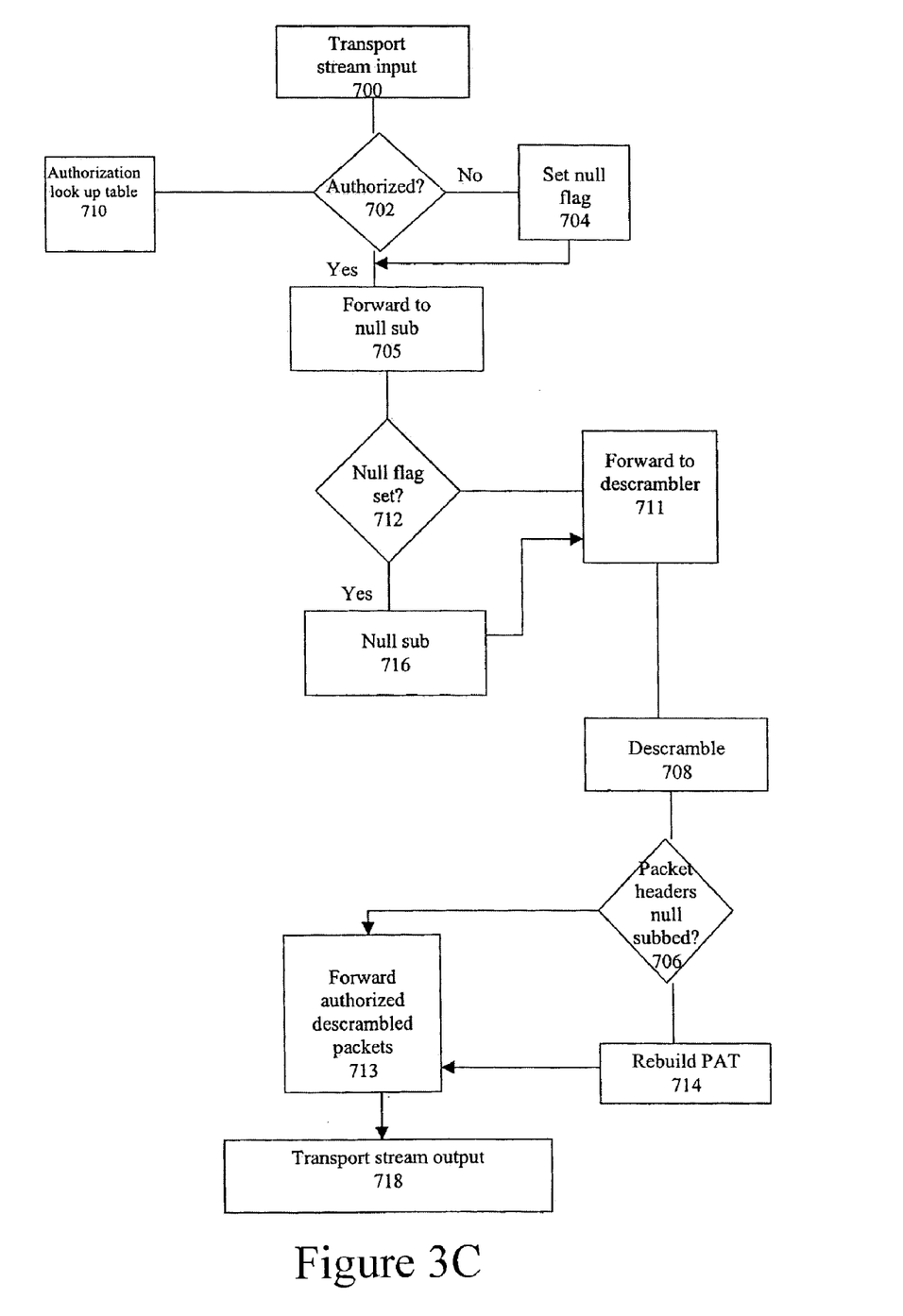
FIG. 3C is a flow chart of another alternative single key multiple authorization system.

FIGS. 2C and 3C are a block diagram and flowchart, respectively, for another alternative embodiment of the present invention. This embodiment also processes null substitution and descrambling serially.

As before, a data transport stream is input 700 into a header processing logic block 102 which uses the authorization look up table 110 to determine if the received packet is authorized 702. If it is not authorized, a null set insertion flag 104 is set at step 704. The packet is forwarded to the null set insertion block 116 at step 705. If the null substitution flag is set 712 the null set insertion block 116 will insert null sets for the unauthorized packet 716.

The packet is forwarded to descrambler block 108 at step 711 either after null set insertion 716 has occurred or after step 712 if no null set insertion flag was set. Accordingly, unauthorized programs have null sets inserted for them at block 116, and authorized programs, pass through null set insertion block 116 still scrambled.

Descrambler 108 receives scrambled authorized packets or unauthorized packets containing null sets and, in either case, descrambles them 708. The packet is then forwarded to the null substitution block 106 which determines if the packet has had null sets inserted at step 706. If it has not, the packet is a descrambled, authorized packet which is passed on 713 to the transport stream output 718. If the null substitution block 106 determines that a null set has been inserted for the received packet, it performs the Program Association Table rebuild using the table insertion buffer 114 at step 714. Thereafter, when required, the empty packet with the rebuilt header and Program Association Table is forwarded 713 into the transport data stream output 718.

Another alternative embodiment not shown is that the decoder block may precede the header processing block and its authorization look up step. In such an embodiment, all packets would be descrambled, and then unauthorized packets would be null set substituted.

The Host Processor 32 acquires the PMTs and derives a list of the audio, video and ancillary PIDs associated with the authorized programs. The Host Processor 32 builds a new PAT packet that references only the authorized programs and loads that data into the Table Insert FIFO 114. This packet is inserted in place of the original PAT by the Null and Insertion 106 logic. If required, other program tables may be processed similarly. The Transport Stream Output 118 contains the new PAT and all PMT, audio, video, and ancillary PIDs referenced in the authorization table and all non-authorized scrambled packets are replaced with null packets.

The descrambler initialization sequence is repeated when a revised authorization table is received or the input transport stream is newly acquired.

PAT Table Rebuilding

Before the decrypted, authorized data can be output for play, they must be reorganized again in order that the output transport stream 118 receives them in a format that it can execute. Parallel output transport stream 118 is preconfigured to receive MPEG protocol data transport streams including the MPEG protocol PATs and PMTs. Accordingly, the PATs are reconfigured 114, to present the authorized PATs in order and in the accepted Asynchronous Serial Interface that the cable head-ins of the play equipment are configured to receive. The PATs and, if required, the PMTs are "re-built."

The null substitution step of the present invention substitutes a null set for each unauthorized packet. PATs and PMTs are received in packet form, just like the content video and audio packets, each having the PIDs by which the control instructions distinguish authorized from unauthorized packets. Accordingly, the authorization step of null substituting unauthorized packets will null substitute the required PAT and PMT packets as well as the content packets. At least some authorized content packets will lose the PATs and PMTs that are necessary to play them. It is necessary then, in the depicted embodiment, that PATs and PMTs be re-inserted before the data transport stream is output for routing to cable TV subscribers or other external play equipment. Those of skill in the art will recognize that other protocols may require differing degrees or types of "re-building" their tables, or in some cases none at all.

Figure 4:
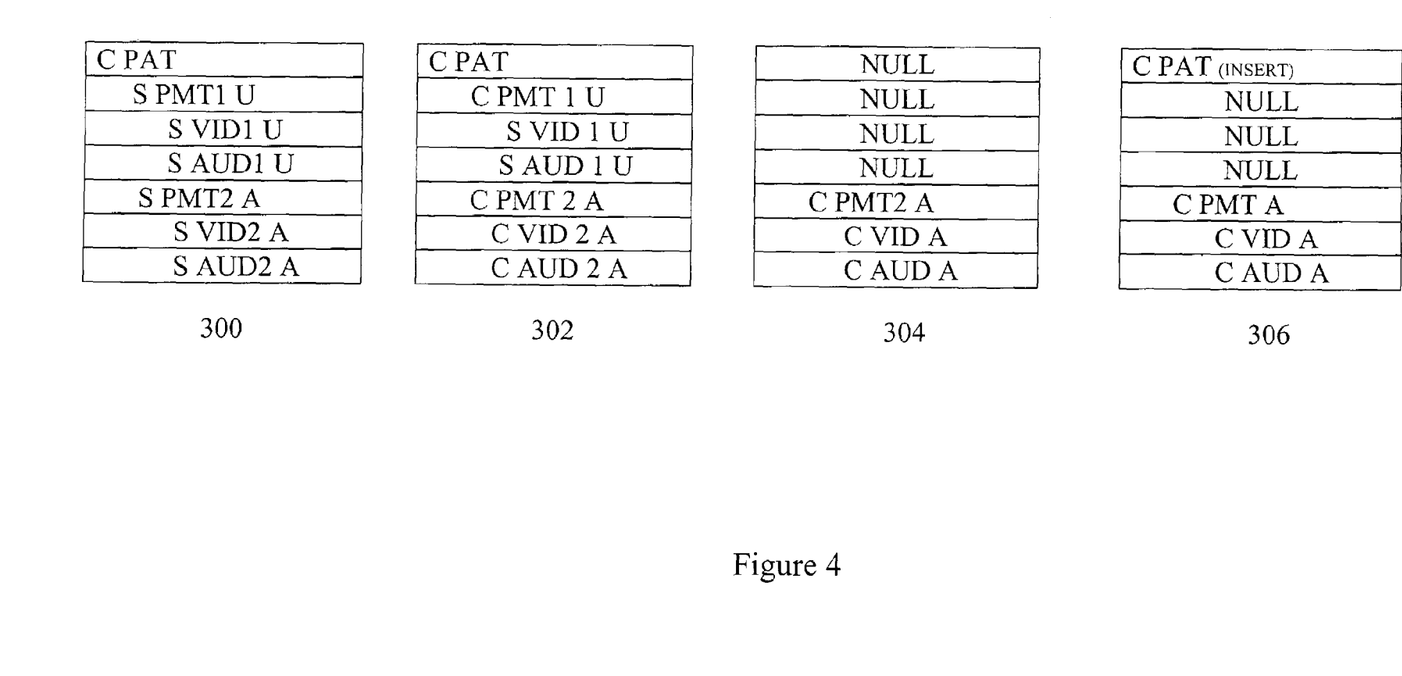
FIG. 4 is an illustration of data packet configurations for a first embodiment.
Figure 5:
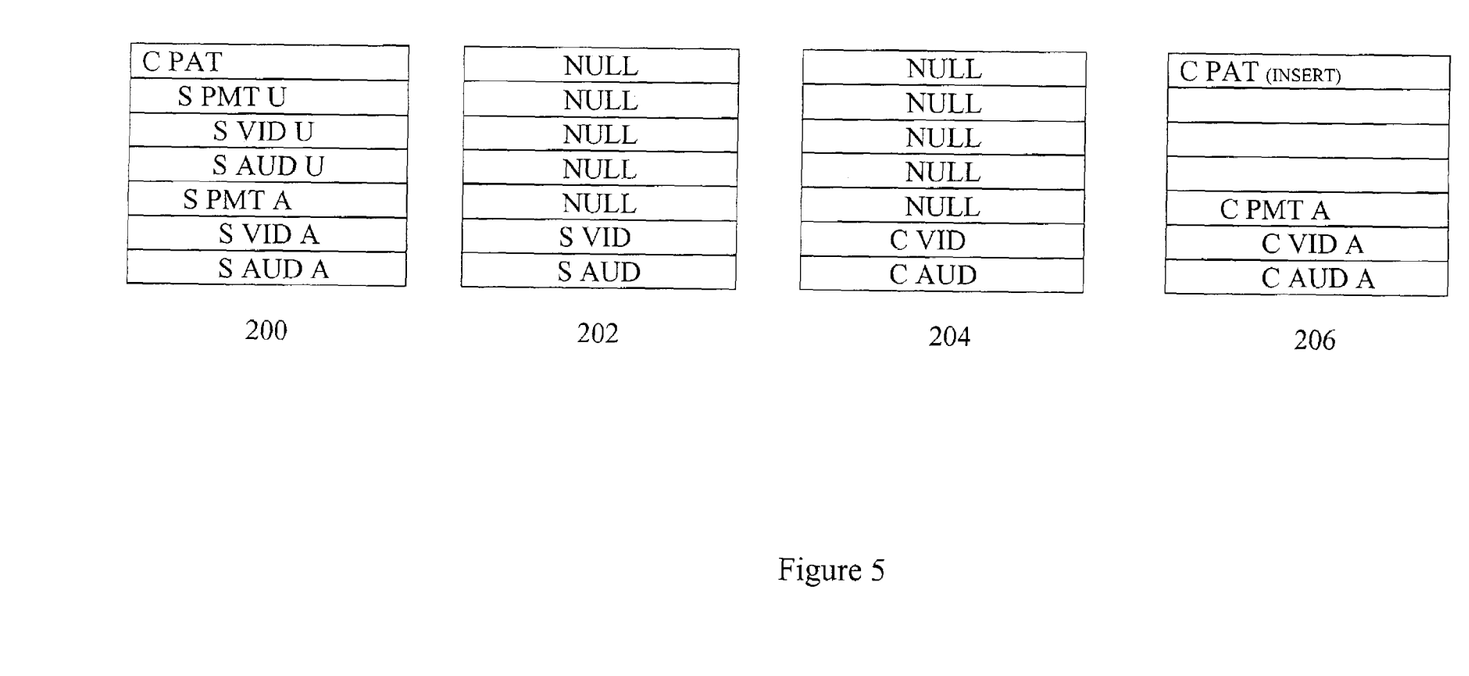
FIG. 5 is an illustration of data packet configurations for a second embodiment.

FIGS. 4 and 5 illustrate the progress of the data packets through the application of the depicted method of the single key/multiple authorization process. The incoming transport data stream includes a PAT. PATs are not scrambled on transmission; they are "clear," which is indicated by "C." Under the PAT is the PMT, which may be scrambled (encrypted), as indicated by "S." Under the PMT are the Video, "VID" and audio "AUD" content packets. In the embodiment illustrated by FIG. 4, only two programs are shown. (In actuality, up to 65,000 programs may be broadcast). A first program is designated "1" and a second program as "2." Block 200 illustrates the incoming data transport stream.

The host processor 32 now applies the control instructions for authorizing programs. In the illustration, one program, for example, program 1, is authorized, "A," and the other, program 2, is not, "U." As described above, the incoming raw data transport stream has its headers processed to match to the authorization flags in PID authorization lookup table 110.

FIG. 4 illustrates the data packet status when the embodiment depicted in FIGS. 2A and 3A is used. In this embodiment, the decoder 108 precedes the null-substitution block 106. This configuration is useful for the fact that unauthorized video and audio content is never decrypted, although the PAT and PMT packets for it are decrypted. Block 302 represents the packet states after descrambling. As can be seen, in this second embodiment, the PAT remains clear, the PMTs, video and audio packets for the unauthorized program 1 are still scrambled, as indicated by the "S" before PMT 1, VID 1 and AUD 1 and the packets for authorized program 2 have been decrypted. Next, the null substitution step inserts null sets for all packets not having an authorization, 304. Because the null substitution PAT is required in the output data transport stream, it must be reinserted 306. Format 306 represents the status of the final output data transport stream.

In the embodiment depicted in FIGS. 2C and 3C, unauthorized packets are null substituted 106 first, producing a transport stream of packets as illustrated in block 202. Authorized packets are decoded, 108, producing a transport stream of packets that are clear, "C," as illustrated in block 204. This block is not yet in a format that can be output.

To finalize the authorized, decrypted packets transport stream for play by the external play equipment, PATs and PMTs are re-inserted 114, if required. The host processor 32, again pursuant to received control instructions, designates a PAT and PMT for each outgoing, decrypted group of packets comprising the authorized programs. Alternatively, the control instructions may provide properly formatted tables for null set content packets, or may rearrange the order of programming, or substitute one program for another, to maintain flexibility for customers. In either case, the transport stream is now in a format 206 that may be output 118 to the external play equipment and be received ready to play.

The reinsertion of PIDs for PATs in those packets that have had null sets inserted may be optimized so that rebuilt PATs may be inserted into the data transport stream at any time when an appropriate space presents itself and is available. The only constraint is that whatever the data transport stream protocol is being used, for example MPEG-2, PATs will need to be presented among the data transport stream output on regular, preconfigured intervals prescribed by the protocol.

It is preferred that entire packets be null substituted when they are unauthorized, followed by reinsertion of PAT and PID information necessary for the transport stream output format. However, it remains within the scope of the present invention that a logic circuit substituting null sets for the payload, and leaving the original headers in tact may be executed.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It is within the scope of the present invention that implementation may be executed as follows:

A method for multiple authorization, reduced key transmission in a system for distributing content data including a plurality of content data packets comprising a plurality of programs, said transmission method comprising: storing at least one authorization indicator, said at least one authorization indicator distinguishing at least one authorized program from at least one unauthorized program; receiving a transport data stream including at least two programs; authorizing said at least one authorized program by comparing each of said plurality of programs to said stored at least one authorization indicator; substituting null sets for said content data packets comprising said at least one unauthorized program; decoding said at least one authorized program, said decoding being executed with a number of keys, said number of keys being fewer than a number of said plurality of programs; configuring an output data transport stream, said output data transport stream configuration step comprising substitution of at least one new data packet table for said at least one null set, when said at least one null set has been substituted for a preexisting data packet table; and at least one of said storing step, said receiving step, said authorizing step, said substituting step, said decoding step or said configuring step being adapted to be executed in hardware.

The method may be executed with data packet table being a program association table.

The method may be executed with the program association table having at least one program map table.

The invention may be embodied as a scrambled data transport stream comprising: a plurality of content data packets, each content data packet having a header, each header having identification bits unique to each of said packets and having encryption bits indicating if said packet is encrypted, at least one group of said plurality of content data packets being encrypted; Program Allocation Tables, said Program Allocation Tables also comprising packets, said Program Allocation Tables defining a plurality of said content data packets that comprise each of a plurality of programs; an authorization look up table, said authorization look up table being stored in a memory accessible by a receiver, said authorization look up table having a plurality of authorization indicators indicating authorized content data packets corresponding to authorized programs and indicating unauthorized content data packets corresponding to unauthorized programs, said indicators being configured such that the receiver processes said authorized content data packets for descrambling and such that the receiver processes said unauthorized content data packets for null set substitution and for reinsertion of Program Allocation Tables in output data packets in an output data transport stream; at least two seeds, for the receiver, said seeds enabling the descrambling of said authorized content data packets, said seeds being encrypted according to a number of keys, said number of keys being fewer than a number of said authorized programs.

The data transport stream may have only one key.

The data transport stream may have the keys encrypted, said encryption of said number of keys being different than said encryption of said at least one group of content data packets.

The content data packets may be configured according to DVB standards.

The content data packets may be video and audio.

What is claimed is:

1. A reduced key, multiple authorization system for a content data distribution system distributing content data having a plurality of programs, each transmittable in a plurality of data packets comprising:

a receiver having a memory and having a decrypter and having a processor;

an authorization indicator stored in said memory and said authorization indicator being transmitted among said data packets, said authorization indicator identifying a plurality of authorized data packets corresponding to at least one authorized program;

a number of keys, said keys encrypting said data packets and said keys being transmittable to said receiver and said keys being executable by said decrypter to decrypt said data packets;

said processor being in operative communication with said memory and with said decrypter, and said processor outputting decrypted authorized data packets;

said number of keys being fewer than said plurality of programs;

said authorization indicator further identifying a plurality of unauthorized data packets corresponding to at least one unauthorized program;

said processor outputting a plurality of null sets in said unauthorized packets; and a data packet table rebuilder that receives said at least one null sets and rebuilds a data packet table by substituting a new data packet table for each of said at least one null set that formerly contained an original data packet table before being substituted for said at least one null set.

2. The system of claim 1, wherein said data packet table is a program association table.

3. The system of claim 2, wherein said program association table further comprises at least one program map table.

4. A method for multiple authorization, reduced key transmission in a system for distributing content data including a plurality of content data packets comprising a plurality of programs, said transmission method comprising:

storing at least one authorization indicator, said at least one authorization indicator distinguishing at least one authorized program from at least one unauthorized program;

receiving a transport data stream including at least two programs;

authorizing said at least one authorized program by comparing each of said plurality of programs to said stored at least one authorization indicator;

substituting null sets for said content data packets comprising said at least one unauthorized program;

decoding said at least one authorized program, said decoding being executed with a number of keys, said number of keys being fewer than a number of said plurality of programs; and configuring an output data transport stream, said output data transport stream configuration step comprising substitution of at least one new data packet table for said at least one null set, when said at least one null set has been substituted for a preexisting data packet table.

5. The method of claim 4, wherein said data packet table is a program association table.

6. The method of claim 5, wherein said program association table includes at least one program map table.

7. A data structure for multiple authorization, reduced key content data transmission comprising:

an authorization look up table distinguishing at least one authorized program from at least one unauthorized program among a plurality of received programs;

an instruction to authorize at least one received program in a data transport stream by comparing at least one authorization identifier in at least one data packet identification header for one of said plurality of received programs to said authorization look up table;

a decryption algorithm using a number of keys to decrypt a plurality of received programs in a data transport stream, said number of keys being less than said plurality of received programs;

a null substitution instruction to replace at least one data packet comprising at least one unauthorized program with at least one null set;

a routing instruction executed by a processor in operative communication with said authorization look up table, and with said transport data stream and with said decryption algorithm;

said routing instruction directing execution of said authorization instruction and said decryption algorithm and said routing instruction outputting said data transport stream such that said data transport stream contains decrypted authorized programs and no decrypted unauthorized programs; and a data packet table insertion circuit configured to replace data packet tables that have been substituted with null sets by said a null substitution circuit with new data packet tables for output into an output data transport stream, said data packet table insertion circuit being in operative communication with a descrambler and with said null substitution circuit.

8. A method for multiple authorization, reduced key transmission in a system for distributing content data including a plurality of content data packets comprising a plurality of programs, said transmission method comprising:

storing at least one authorization indicator, said at least one authorization indicator distinguishing at least one authorized program from at least one unauthorized program;

receiving a transport data stream including at least two programs;

authorizing said at least one authorized program by comparing each of said plurality of programs to said stored at least one authorization indicator;

substituting null sets for said content data packets comprising said at least one unauthorized program;

decoding said at least one authorized program, said decoding being executed with a number of keys, said number of keys being fewer than a number of said plurality of programs;

configuring an output data transport stream, said output data transport stream configuration step comprising substitution of at least one new data packet table for said at least one null set, when said at least one null set has been substituted for a preexisting data packet table; and at least one of said storing step, said receiving step, said authorizing step, said substituting step, said decoding step or said configuring step being adapted to be executed in hardware.

9. The method of claim 8, wherein said data packet table is a program association table.

10. The method of claim 9, wherein said program association table includes at least one program map table.

11. Scrambled data embodied on a computer-readable medium comprising:

a plurality of content data packets, each content data packet having a header, each header having identification bits unique to each of said packets and having encryption bits indicating if said packet is encrypted, at least one group of said plurality of content data packets being encrypted;

Program Allocation Tables, said Program Allocation Tables also comprising packets, said Program Allocation Tables defining a plurality of said content data packets that comprise each of a plurality of programs;

an authorization look up table, said authorization look up table being stored in a memory accessible by a receiver, said authorization look up table having a plurality of authorization indicators indicating authorized content data packets corresponding to authorized programs and indicating unauthorized content data packets corresponding to unauthorized programs, said indicators being configured such that the receiver processes said authorized content data packets for descrambling and such that the receiver processes said unauthorized content data packets for null set substitution and for reinsertion of Program Allocation Tables in output data packets in an output data transport stream;

at least two seeds, for the receiver, said seeds enabling the descrambling of said authorized content data packets, said seeds being encrypted according to a number of keys, said number of keys being fewer than a number of said authorized programs.

12. The scrambled data embodied on a computer-readable medium of claim 11 wherein said number of keys is one.

13. The scrambled data embodied on a computer-readable medium of claim 11 wherein said number of keys are encrypted, said encryption of said number of keys being different than said encryption of said at least one group of content data packets.

14. The scrambled data embodied on a computer-readable medium of claim 11 wherein said content data packets are configured according to DVB standards.

15. The scrambled data embodied on a computer-readable medium of claim 11 wherein said content data packets are video and audio.

* * * * *